(12) United States Patent
Parker et al.

(10) Patent No.: US 7,264,749 B2
(45) Date of Patent: Sep. 4, 2007

(54) ALKYNE COMPOUNDS

(75) Inventors: Robert Parker, Mannheim (DE); Norbert Schneider, Altrip (DE); Gerhard Wagenblast, Wachenheim (DE); Ruediger Sens, Ludwigshafen (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 93 days.

(21) Appl. No.: 10/510,748

(22) PCT Filed: Apr. 25, 2003

(86) PCT No.: PCT/EP03/04295

§ 371 (c)(1), (2), (4) Date: Oct. 12, 2004

(87) PCT Pub. No.: WO03/093216

PCT Pub. Date: Nov. 13, 2003

(65) Prior Publication Data

US 2005/0151118 A1 Jul. 14, 2005

(30) Foreign Application Priority Data

Apr. 29, 2002 (DE) ................................ 102 19 202

(51) Int. Cl.
*C09K 19/18* (2006.01)
*C07C 69/96* (2006.01)

(52) U.S. Cl. .................... 252/299.01; 428/1.3; 428/1.6; 558/265; 558/266; 558/267; 558/268; 558/270; 558/271

(58) Field of Classification Search ................ 428/1.1, 428/1.2, 1.3, 1.6; 252/299.01; 558/265, 558/266, 267, 268, 270, 271
See application file for complete search history.

(56) References Cited

U.S. PATENT DOCUMENTS

| 5,798,147 | A | * | 8/1998 | Beck et al. .................. 427/511 |
| 6,136,225 | A | | 10/2000 | Meyer et al. |
| 6,136,251 | A | | 10/2000 | Etzbach et al. |
| 6,616,990 | B2 | * | 9/2003 | Prechtl et al. ............... 428/1.1 |

FOREIGN PATENT DOCUMENTS

| DE | 39 05 932 | 9/1989 |
| DE | 198 35 730 | 2/1999 |
| DE | 198 43 724 | 4/1999 |
| DE | 199 26 044 | 12/1999 |
| DE | 100 64 291 | 7/2001 |
| EP | 727 473 | 8/1996 |
| EP | 747 382 | 12/1996 |
| EP | 750 029 | 12/1996 |
| EP | 930 286 | 7/1999 |
| EP | 968 988 | 1/2000 |
| EP | 1 054 001 | 11/2000 |
| EP | 1 134 270 | 9/2001 |
| EP | 1 136 478 | 9/2001 |
| FR | 2 234 261 | 2/1975 |
| GB | 1 429 513 | 3/1976 |

(Continued)

OTHER PUBLICATIONS

English translation by computer for JP 2001-199938, http://www4.ipdl.ncipi.go.jp/Tokujitu/PAJdetail.ipdl?N0000=60&N0120=01&N2001=2&N3001=2001-199938.*

(Continued)

*Primary Examiner*—Shean C Wu
(74) *Attorney, Agent, or Firm*—Oblon, Spivak, McClelland, Maier & Neustadt, P.C.

(57) ABSTRACT

The present invention relates to alkyne compounds of the formula I $$P^1-Y^1-A^1-Y^3-(T^1-B^1-)_m-T^3-C{\equiv}C-T^4-(B^2-T^2-)_n-Y^4-A^2-Y^2-P^2 \quad (I)$$

in which
$P^1$, $P^2$ are each, independently of one another, hydrogen, $C_1$-$C_{12}$-alkyl, a polymerizable group or a group suitable for polymerization or a radical which carries a polymerizable group or a group suitable for polymerization,
$Y^1$, $Y^2$, $Y^3$, $Y^4$ are each, independently of one another, a linking unit,
$B^1$, $B^2$ are each, independently of one another, —C≡C— or a linking group as defined for $Y^1$ to $Y^4$,
$A^1$, $A^2$ are each, independently of one another, a single chemical bond or a spacer having from one to 30 carbon atoms,
$T^1$, $T^2$, $T^3$, $T^4$ are each, independently of one another, a divalent saturated or unsaturated carbocyclic or heterocyclic radical, and
m, n are each, independently of one another, 0 or 1,
with the proviso that at least one of the linking units $Y^3$ or $Y^4$ is a group —O—CO—O—, —O—CO—N(R)—, —(R)N—CO—O— or —(R)N—CO—N(R)—.

The invention further relates to nonpolymerizable and polymerizable liquid-crystalline compositions comprising at least one alkyne compound of the formula I according to the invention, the use of these nonpolymerizable and polymerizable liquid-crystalline compositions for producing optical components, the use of the polymerizable liquid-crystalline compositions for printing or coating substrates, for preparing dispersions and emulsions, for producing films and pigments and optical components, printed or coated substrates, dispersions and emulsions, films and pigments of this type.

15 Claims, No Drawings

FOREIGN PATENT DOCUMENTS

| | | |
|---|---|---|
| WO | 95/16007 | 6/1995 |
| WO | 95/22586 | 8/1995 |
| WO | 95/24454 | 9/1995 |
| WO | 95/24455 | 9/1995 |
| WO | 96/02597 | 2/1996 |
| WO | 96/04351 | 2/1996 |
| WO | 96/24647 | 8/1996 |
| WO | 97/00600 | 1/1997 |
| WO | 97/27251 | 7/1997 |
| WO | 97/27252 | 7/1997 |
| WO | 97/34862 | 9/1997 |
| WO | 98/47979 | 10/1998 |
| WO | 99/11733 | 3/1999 |
| WO | 99/19267 | 4/1999 |
| WO | 99/47694 | 9/1999 |
| GB | 2 155 465 | 9/1985 |
| GB | 2 334 718 | 9/1999 |
| GB | 2 351 734 | 1/2001 |
| GB | 2388599 * | 11/2003 |
| JP | 11-80090 | 3/1999 |
| JP | 2000-281628 | 10/2000 |
| JP | 2000-281629 | 10/2000 |
| JP | 2000-284292 * | 10/2000 |
| JP | 2001-199938 * | 7/2001 |
| JP | 2001-220368 | 8/2001 |

OTHER PUBLICATIONS

English translation by computer for JP 2000-284292, http://www4.ipdl.ncipi.go.jp/Tokujitu/PAJdetail.ipdl?N0000=60&N0120=01&N2001=2&N3001=2000-284292.*

Andrew P. Davey, et al., "Polarised photoluminescence from oriented polymer liquid crystal films", J. Mater. Chem., vol. 7, No. 3, pp. 417-420 1997.

N. Leroux, et al., "Synthesis and properties of new mesomorphic side-on systems", Liquid Crystals, vol. 21, No. 2, pp. 189-195 1996.

* cited by examiner

ALKYNE COMPOUNDS

The present invention relates to alkyne compounds of the formula I $$P^1\text{—}Y^1\text{-}A^1\text{-}Y^3\text{-}(T^1\text{-}B^1\text{-})_m T^3\text{-}C\equiv C\text{-}T^4\text{-}(B^2\text{-}T^2\text{-})_n\text{-}Y^4\text{-}A^2\text{-}Y^2\text{—}P^2 \quad (I)$$

in which $P^1$, $P^2$ are each, independently of one another, hydrogen, $C_1$-$C_{12}$-alkyl, a polymerizable group or a group suitable for polymerization or a radical which carries a polymerizable group or a group suitable for polymerization, $Y^1$, $Y^2$, $Y^3$, $Y^4$ are each, independently of one another, a single chemical bond, —O—, —S—, —CO—, —CO—O—, —O—CO—, —CO—N(R)—, —(R)N—CO—, —O—CO—O—, —O—CO—N(R)—, —(R)N—CO—O— or —(R)N—CO—N(R)—, $B^1$, $B^2$ are each, independently of one another, —C≡C—, a single chemical bond, —O—, —S—, —CO—, —CO—O—, —O—CO—, —CO—N(R)—, —(R)N—CO—, —O—CO—O—, —O—CO—N(R)—, —(R)N—CO—O— or —(R)N—CO—N(R)—, R, at each occurrence and independently of the meaning in $Y^1$ to $Y^4$, $B^1$ and $B^2$, is hydrogen or $C_1$-$C_4$-alkyl, $A^1$, $A^2$ are each, independently of one another, a single chemical bond or a spacer having from one to 30 carbon atoms, $T^1$, $T^2$, $T^3$, $T^4$ are each, independently of one another, a divalent saturated or unsaturated carbocyclic or heterocyclic radical, and m, n are each, independently of one another, 0 or 1, with the proviso that at least one of the linking units $Y^3$ or $Y^4$ is a group —O—CO—O—, —O—CO—N(R)—, —(R)N—CO—O— or —(R)N—CO—N(R)—.

The invention further relates to nonpolymerizable or polymerizable liquid-crystalline compositions comprising at least one alkyne compound of the formula I according to the invention, the use of these nonpolymerizable and polymerizable liquid-crystalline compositions for producing optical components, the use of the polymerizable liquid-crystalline compositions for printing or coating substrates, for preparing dispersions and emulsions, and for producing films or pigments and optical components, printed or coated substrates, dispersions and emulsions, films and pigments of this type.

Because of their comparatively high birefringent properties, liquid-crystalline systems comprising alkyne compounds are of interest, inter alia, for broadband reflective elements in electrooptical applications. A variety of such alkyne derivatives and applications thereof are described, for example, in the documents DE 39 05 932 A1, DE 199 26 044 A1, DE 100 64 291 A1, FR 2 234 261, GB 2 155 465 A, GB 2 334 718 A, GB 2 351 734 A, JP 11-080090 A, JP P2000-281628A, JP P2000-281629A, EP 0 727 473 A2, EP 0 930 286 A1, EP 0 968 988 A1, EP 1 054 001 A1 and the publications of A. P. Davey et al. (J. Mater. Chem., 1997, 7(3), 417-420) and N. Leroux and L.-C. Chien (Liquid Crystals, 1996, Vol. 21, No. 2, 189-195).

In addition to other criteria which usually have to be met by liquid-crystalline materials, such as a very high anisotropy of the dielectric properties and a very high resistivity, their phase behavior is also important. These materials should exhibit the desired liquid-crystalline behavior over a broad temperature range so as to provide, for example, a very wide choice in terms of processing conditions.

It is therefore an object of the present invention to provide further alkyne compounds which have comparatively high birefringent properties and are suitable for preparing liquid-crystalline compositions and which exhibit, themselves or in the form of such compositions, a phase width which is sufficiently large for processing.

We have found that this object is achieved by the alkyne compounds of the formula I described at the outset.

$C_1$-$C_{12}$-Alkyl radicals for $P^1$ and $P^2$ in formula I are branched or unbranched $C_1$-$C_{12}$-alkyl chains, for example methyl, ethyl, n-propyl, 1-methylethyl, n-butyl, 1-methylpropyl-, 2-methylpropyl, 1,1-dimethylethyl, n-pentyl, 1-methylbutyl, 2-methylbutyl, 3-methylbutyl, 2,2-dimethylpropyl, 1-ethylpropyl, n-hexyl, 1,1-dimethylpropyl, 1,2-dimethylpropyl, 1-methylpentyl, 2-methylpentyl, 3-methylpentyl, 4-methylpentyl, 1,1-dimethylbutyl, 1,2-dimethylbutyl, 1,3-dimethylbutyl, 2,2-dimethylbutyl, 2,3-dimethylbutyl, 3,3-dimethylbutyl, 1-ethylbutyl, 2-ethylbutyl, 1,1,2-trimethylpropyl, 1,2,2-trimethylpropyl, 1-ethyl-1-methylpropyl, 1-ethyl-2-methylpropyl, n-heptyl, n-octyl, 2-ethylhexyl, n-nonyl, n-decyl, n-undecyl and n-dodecyl.

Preferred alkyl radicals for $P^1$ and $P^2$ are the branched or unbranched $C_1$-$C_6$-alkyl chains, for example methyl, ethyl, n-propyl, 1-methylethyl, n-butyl, 1-methylpropyl-, 2-methylpropyl, 1,1-dimethylethyl, n-pentyl, 1-methylbutyl, 2-methylbutyl, 3-methylbutyl, 2,2-dimethylpropyl, 1-ethylpropyl and n-hexyl.

Polymerizable groups or groups suitable for polymerization or radicals which carry a polymerizable group or a group suitable for polymerization (such groups or radicals are hereinafter also simply called "reactive radicals") which are suitable for $P^1$ and $P^2$ are in particular:

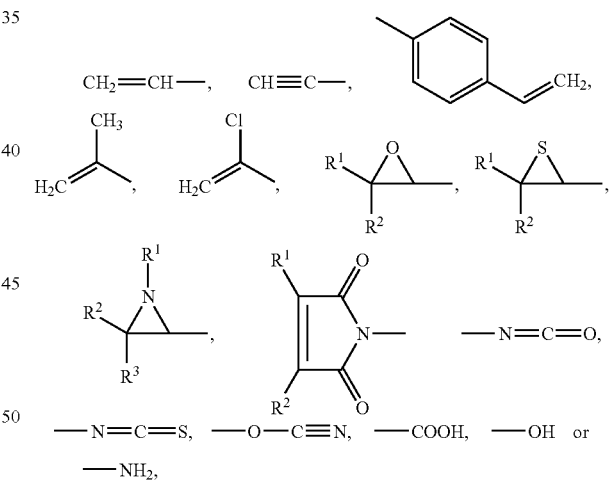

where $R^1$ to $R^3$ may be identical or different and are each hydrogen or $C_1$-$C_4$-alkyl, such as methyl, ethyl, n-propyl, isopropyl, n-butyl, isobutyl, sec-butyl or tert-butyl.

Particularly suitable reactive radicals for $P^1$ and $P^2$ are 1-methylvinyl and vinyl. Within the context of these radicals, particularly suitable linking units $Y^1$ and $Y^2$ are carboxyl, —CO—O— or —O—CO—, and a single chemical bond. Particularly suitable moieties $P^1$—$Y^1$— and —$Y^2$—$P^2$ comprising reactive radicals are therefore acrylate, methacrylate and vinyl.

Of the reactive radicals, the cyanates can spontaneously trimerize to cyanurates. The other groups mentioned usually require further compounds containing complementary reactive radicals for polymerization. Thus, for example, isocyanates can polymerize with alcohols to give urethanes and with amines to give urea derivatives. Thiiranes and aziridines behave similarly.

Carboxyl groups can be condensed to give polyesters and polyamides. The maleimido group is particularly suitable for free-radical copolymerization with olefinic compounds, for example styrene, or compounds comprising styrene structural elements.

The reactive radicals and the reactive radicals complementary thereto may be present in a single alkyne compound according to the invention or in an additional alkyne compound according to the invention.

Alternatively, the complementary reactive radicals may be present in further compounds not according to the invention. Examples of the latter are polyhydric alcohols, such as ethylene glycol, propylene glycol and their more highly condensed representatives, for example diethylene glycol, triethylene glycol, dipropylene glycol, tripropylene glycol etc., butanediol, pentanediol, hexanediol, neopentyl glycol, alkoxylated phenolic compounds, such as ethoxylated or propoxylated bisphenols, cyclohexanedimethanol, alcohols with a functionality of three or more, such as glycerol, trimethylolpropane, butanetriol, trimethylolethane, pentaerythritol, ditrimethylolpropane, dipentaerythritol, sorbitol, mannitol and the corresponding alkoxylated, especially ethoxylated and propoxylated, alcohols. Further suitable compounds are amino alcohols which are derived from the abovementioned alcohols by replacing one or more hydroxyl groups by amino groups.

Suitable $C_1$-$C_4$-alkyl groups for R in the groups —CO—N(R)—, —(R)N—CO—, —O—CO—N(R)—, —(R)N—CO—O— and —(R)N—CO—N(R)— shown below the linking units $Y^1$ to $Y^4$ and $B^1$, $B^2$ are methyl, ethyl, n-propyl, isopropyl, n-butyl, isobutyl, sec-butyl and tert-butyl. If one or two radicals R are present in one of the linking units $Y^1$ to $Y^4$ and $B^1$, $B^2$, radicals R which may be present in the other units may be identical or different. The same applies if two radicals R are present in one unit.

Suitable spacers $A^1$ and $A^2$ are all groups known for this purpose to a person skilled in the art. The spacers usually contain one to 30, preferably one to 12, particularly preferably one to six, carbon atoms and consist of predominantly linear aliphatic groups. The spacers may be interrupted in the chain, for example by non-adjacent oxygen or sulfur atoms or imino or alkylimino groups, for example methylimino groups. Suitable substituents for the spacer chain are fluorine, chlorine, bromine, cyano, methyl and ethyl.

Examples of representative spacers are:

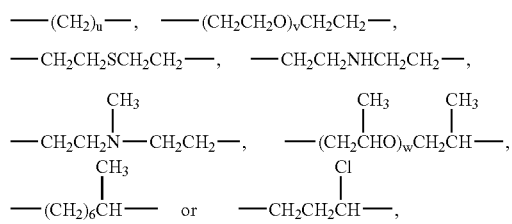

where u, v and w are integers and u is 1 to 30, preferably 1 to 12, v is 1 to 14, preferably 1 to 5, and w is 1 to 9, preferably 1 to 3.

Preferred spacers are ethylene, propylene, n-butylene, n-pentylene and n-hexylene.

The radicals $T^1$ to $T^4$ are ring systems which may be substituted by fluorine, chlorine, bromine, cyano, hydroxyl, formyl, nitro, $C_1$-$C_{20}$-alkyl, $C_1$-$C_{20}$-alkoxy, $C_1$-$C_{20}$-alkoxycarbonyl, $C_1$-$C_{20}$-monoalkylaminocarbonyl, $C_1$-$C_{20}$-alkylcarbonyl, $C_1$-$C_{20}$-alkylcarbonyloxy or $C_1$-$C_{20}$-alkylcarbonylamino.

Preferred radicals $T^1$ to $T^4$ are:

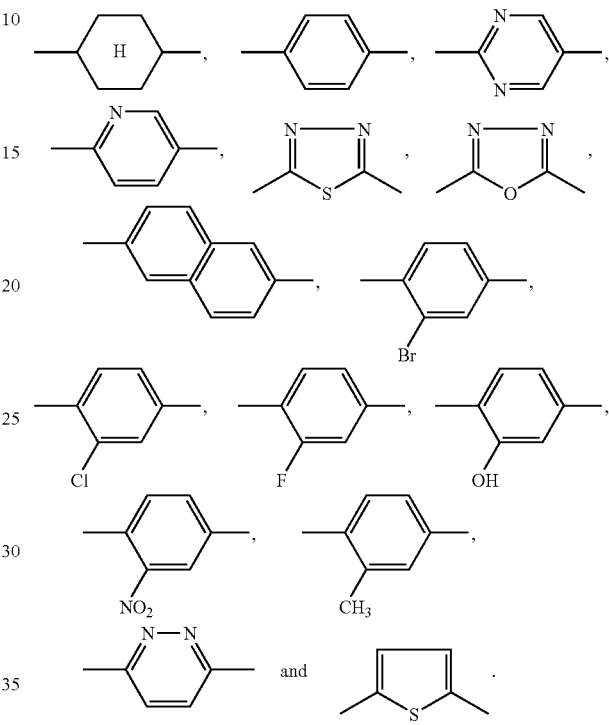

In accordance with the proviso given at the outset, the alkyne compounds of the formula I according to the invention, at least one linking unit $Y^3$ or $Y^4$ interposed between the radicals $A^1$ and $A^2$ and the central moiety $(T^1$-$B^1$-$)_m$-$T^3$-C≡C-$T^4$-$(B^2$-$T^2$-$)_n$ (also designated M below) is a —O—CO—O—, —O—CO—N(R)—, —(R)N—CO—O— or —(R)N—CO—N(R)— group. The other linking unit may be any group listed under the meaning of $Y^1$ to $Y^4$.

Preferred compounds of the formula I according to the invention have, even taking into account the abovementioned preferences, at least one —O—CO—O— group as linking unit $Y^3$ or $Y^4$, where the other linking unit may again be any group listed under the meaning of $Y^1$ to $Y^4$.

Particularly preferred compounds of the formula I are, even when taking into account the abovementioned preferences, those in which both linking units $Y^3$ and $Y^4$ are a —O—CO—O— group.

Further preferred compounds of the formula I are, even taking into account the abovementioned preferences, those in which the sum of the variables m and n is 0 or 1. Therefore, the central unit M preferably comprises two or three divalent saturated or unsaturated carbocyclic or heterocyclic radicals T. Examples of such preferred radicals $T^1$ to $T^4$ have already been mentioned above.

Preferred compounds of the formula I are furthermore, even taking into account the abovementioned preferences, those in which at least one of the radicals $P^1$ or $P^2$ is a polymerizable group or a group suitable for polymerization or a radical which carries a polymerizable group or a group suitable for polymerization. Corresponding reactive radicals and their preferences, also with respect to the linking units $Y^1$ and $Y^2$, have likewise been mentioned above.

The alkyne compounds of the formula I according to the invention are prepared by conventional methods.

One route which is possible in principle is the construction of the central moiety $(T^1\text{-}B^1\text{-})_m\text{-}T^3\text{-}C{\equiv}C\text{-}T^4\text{-}(B^2\text{-}T^2\text{-})_n$ by means of a Sonogashira reaction using starting materials which comprise corresponding molecule fragments $(T^1\text{-}B^1\text{-})_m\text{-}T^3\text{-}C{\equiv}C\text{-}H$ and $Hal\text{-}T^4\text{-}(B^2\text{-}T^2\text{-})_n$ or $(T^1\text{-}B^1\text{-})_m\text{-}T^3\text{-}Hal$ and $H\text{-}C{\equiv}C\text{-}T^4\text{-}(B^2\text{-}T^2\text{-})_n$, where Hal is halogen, preferably iodine. The resulting intermediate compounds are then reacted further to give the target compounds of the formula I by conventional synthetic methods.

Another route involves reacting corresponding starting materials by means of a Sonogashira reaction which already comprise additional molecule fragments $P^1{-}Y^1\text{-}A^1\text{-}Y^3{-}$ and/or $-Y^4\text{-}A^2\text{-}Y^2{-}P^2$. For example, to produce the target compounds of the formula I, compounds of the general formula $P^1{-}Y^1\text{-}A^1\text{-}Y^3\text{-}(T^1\text{-}B^1\text{-})_m\text{-}T^3\text{-}C{\equiv}C{-}H$ can be reacted with compounds of the general formula $Hal\text{-}T^4\text{-}(B^2\text{-}T^2\text{-})_n\text{-}Y^4\text{-}A^2\text{-}Y^2{-}P^2$, compounds of the general formula $P^1{-}Y^1\text{-}A^1\text{-}Y^3\text{-}(T^1\text{-}B^1\text{-})_m\text{-}T^3\text{-}C{\equiv}C{-}H$ can be reacted with compounds comprising fragments of the general formula $Hal\text{-}T^4\text{-}(B^2\text{-}T^2\text{-})_n$, or compounds which comprise fragments of the general formula $(T^1\text{-}B^1\text{-})_m\text{-}T^3\text{-}C{\equiv}C{-}H$ can be reacted with compounds of the general formula $Hal\text{-}T^4\text{-}(B^2\text{-}T^2\text{-})_n\text{-}Y^4\text{-}A^2\text{-}Y^2{-}P^2$. The alkynyl radical $-C{\equiv}C{-}H$ and the halogen atom Hal can of course also in each case be in the other compound or the other fragment, respectively.

The starting alkyne compound, for example $(T^1\text{-}B^1\text{-})_m\text{-}T^3\text{-}C{\equiv}C{-}H$ or $P^1{-}Y^1\text{-}A^1\text{-}Y^3\text{-}(T^1\text{-}B^1\text{-})_m\text{-}T^3\text{-}C{\equiv}C{-}H$, and the starting halogen compound, for example $Hal\text{-}T_4\text{-}(B^2\text{-}T^2\text{-})_n$ or $Hal\text{-}T^4\text{-}(B^2\text{-}T^2\text{-})_n\text{-}Y^4\text{-}A^2\text{-}Y^2{-}P^2$, are usually employed in a molar ratio of 1:1.

According to retrosynthetic considerations, it may be useful to produce, in a first step, e.g. alkyne compounds comprising the fragments

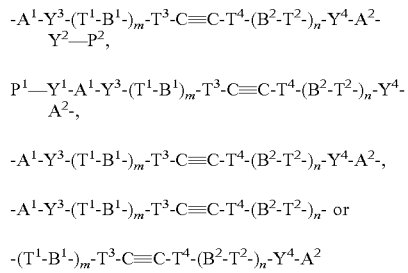

and to convert these compounds into the target compounds of the formula I with the corresponding complementary compounds in one or more subsequent steps.

If $P^1$ and/or $P^2$ are reactive radicals which are unstable under the conditions of a Songashira reaction, it is possible, for example to use suitable starting compounds

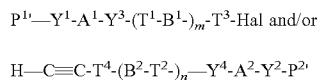

in which the radicals $P^{1\prime}$ and/or $P^{2\prime}$ denote precursor groups which are stable under the reaction conditions. The latter groups can then be converted into the corresponding reactive radicals $P^1$ and/or $P^2$ in a subsequent step.

The present invention further provides nonpolymerizable liquid-crystalline compositions comprising at least one compound f the formula I or a preferred embodiment thereof.

Nonpolymerizable liquid-crystalline compositions for the purposes of the present invention are in particular those compositions which are not capable of forming self-supporting polymerization or condensation products under conventional conditions. These compositions can be prepared, for example, by mixing suitable commercially available liquid-crystalline materials as used, for example, for active LC layers in display technology with one or more of the compounds according to the invention. These compositions may comprise compounds, in particular those of the formula I with reactive radicals, the reactive radical concentration however not being sufficient to produce correspondingly densely crosslinked self-supporting polymerization or condensation products. Accordingly, in such nonpolymerizable compositions, preference is given to using compounds of the formula I in which $P^1$ and $P^2$ in formula I are each hydrogen or $C_1$-$C_{12}$-alkyl.

The invention furthermore provides polymerizable liquid-crystalline compositions comprising at least one compound of the formula I or a preferred embodiment thereof.

These are in particular those compositions in which at least one of the components is capable of forming polymerization or condensation products under conventional conditions. This component does not necessarily have to be a polymerizable compound of the formula I according to the invention. It is only necessary for the liquid-crystalline composition to be polymerizable as such and to be polymerizable or condensable to give self-supporting products.

The desired degree of polymerization, crosslinking and/or condensation after polymerization or condensation is complete may be controlled depending on the number of reactive radicals in the components of these polymerizable liquid-crystalline compositions. In such compositions, the compounds of the formula I according to the invention generally have at least one, usually even two, reactive radicals P. These compounds are easily obtainable by mixing suitable polymerizable, liquid-crystalline materials with one or more of the compounds according to the invention. Suitable polymerizable, liquid-crystalline compounds are described, for example, in WO 95/22586, 95/24454, 95/24455, 96/04351, 96/24647, 97/00600, 97/34862 and 98/47979 and EP 1 134 270 A1 and DE 198 35 730 A1 and have essentially the schematic structure P—Y-A-Y-M-Y-A-Y—P, where P, Y and A have the same meanings as $P^1$ and $P^2$, $Y^1$ to $Y^4$ and $A^1$ and $A^2$ in formula I. M denotes a mesogenic moiety similar to the central moiety $(T^1\text{-}B^1\text{-})_m\text{-}T^3\text{-}C{\equiv}C\text{-}T^4\text{-}(B^2\text{-}T^2\text{-})_n$ in formula I which is likewise abbreviated as M in this application.

The nonpolymerizable and polymerizable liquid-crystalline compositions according to the invention may of course comprise one or more alkyne derivatives as components which are described in the documents listed at the outset. A person skilled in the art may usually select suitable compounds according to whether nonpolymerizable or polymerizable compositions are to be adjusted.

The nonpolymerizable and polymerizable liquid-crystalline compositions according to the invention are not limited to those compositions in which one or more constituents have liquid-crystalline properties per se (in the temperature range of interest), but also include those compositions in which liquid-crystalline behavior is only achieved by mixing the components or by admixing of the compounds according to the invention (e.g. lyotropic systems). Furthermore, the compounds of the formula I according to the invention and preferred embodiments thereof may themselves exhibit liquid-crystalline behavior, but do not necessarily have to exhibit this property.

The reactive compounds which are listed in DE 100 25 782 A1 as component B) of the liquid-crystalline compositions of matter described therein may also be added to the polymerizable liquid-crystalline compositions according to the invention. These mostly low-cost compounds usually do not exhibit liquid-crystalline behavior themselves, but their admixture makes it possible to reduce the proportion of costly compounds in the compositions according to the invention without having a noticeable effect on the liquid-crystalline behavior of the compositions. By means of such reactive compounds, it is furthermore possible to tailor properties of the compositions, such as degree of crosslinking, viscosity, elasticity etc. The person skilled in the art may easily select suitable reactive compounds, if necessary after preliminary experiments. It should be noted that such reactive compounds may also act as (auxiliary) compounds as discussed above.

Depending on the intended use, the nonpolymerizable and polymerizable liquid-crystalline compositions according to the invention may furthermore comprise at least one chiral compound. The addition of chiral compounds leads to cholesteric compositions which have special optical properties, for example viewing angle-dependent color effects, reflection in the IR or UV wavelength range of the spectrum etc.

Preferred chiral compounds correspond to the general formulae Ia to Id

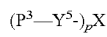  Ia,

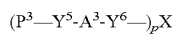  Ib,

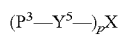  Ic,

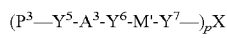  Id, in which M' is a mesogenic group $(T^5-B^3-)_q-T^6$ and $P^3$, $Y^5$ to $Y^7$, $A^3$, $T^5$ and $T^6$ and $B^3$ have the same meaning as $P^1$ and $P^2$, $Y^1$ to $Y^4$, $A^1$ and $A^2$, $T^1$ to $T^4$ and $B^1$ and $B^2$ in the formula I. p is 1, 2, 3, 4, 5 or 6 and X is the corresponding n-valent chiral radical. The p groups attached to the chiral radical X may be identical or different.

Possible radicals X are, for example:

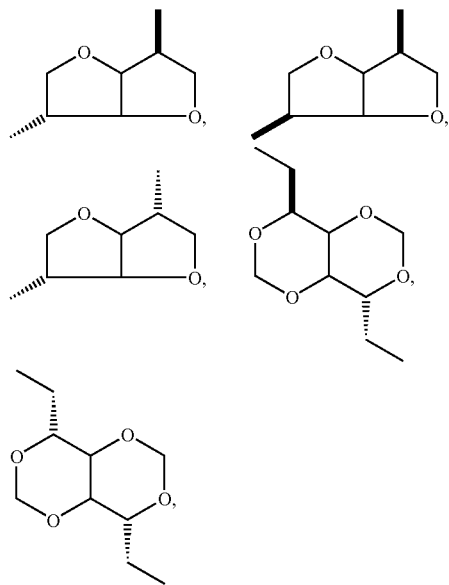

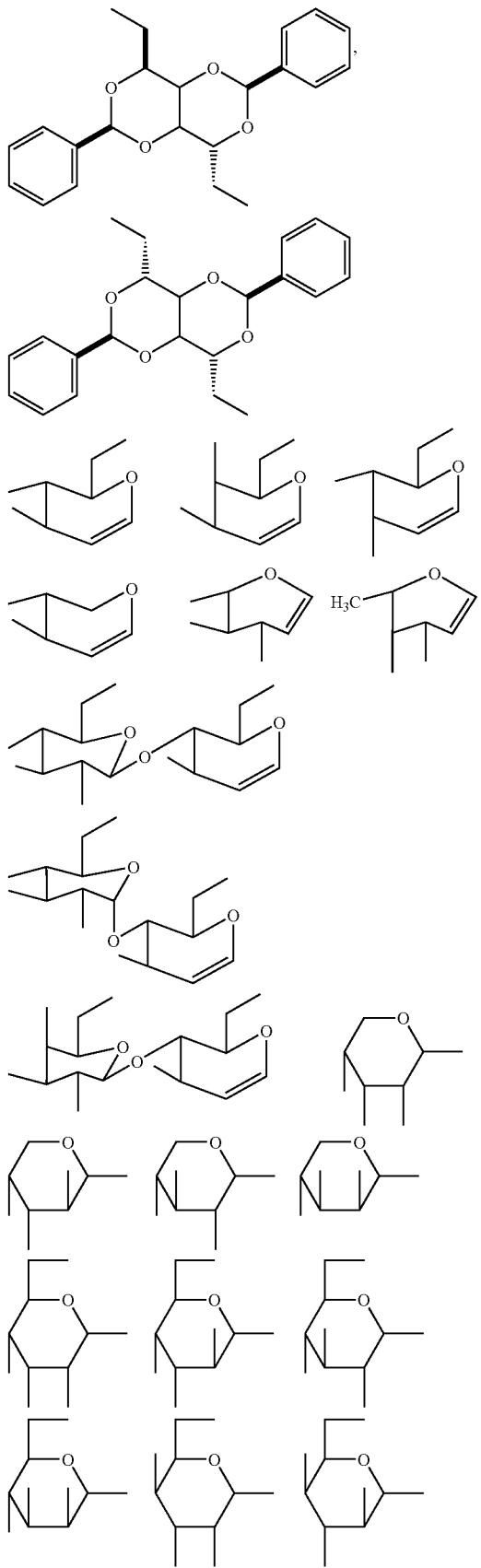

-continued
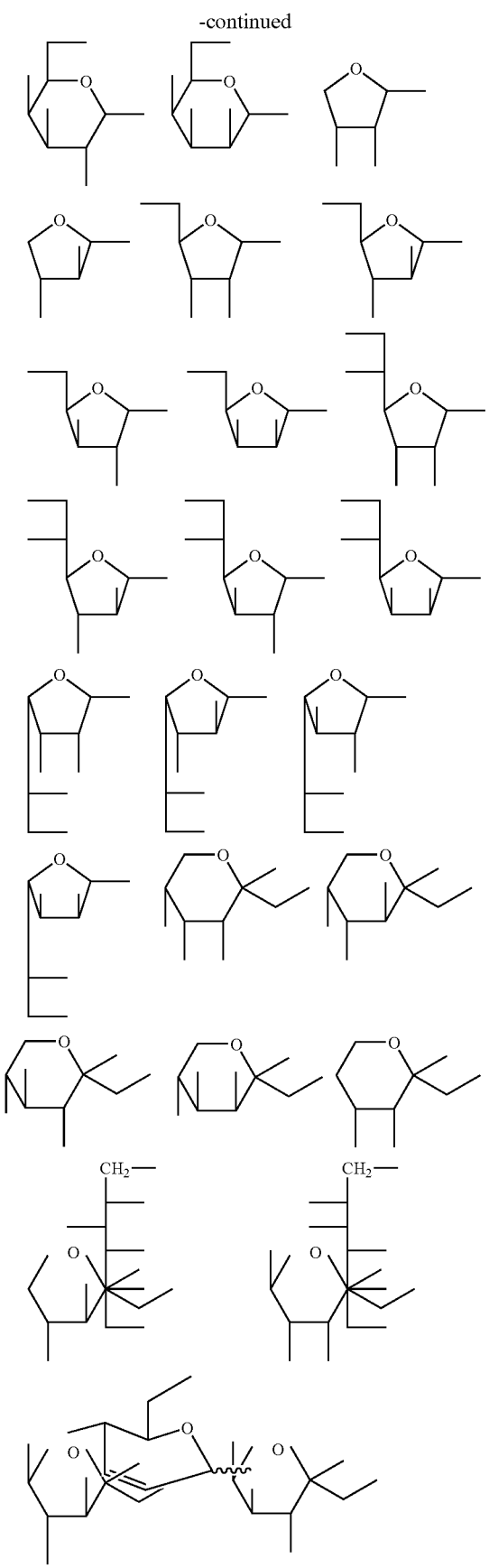
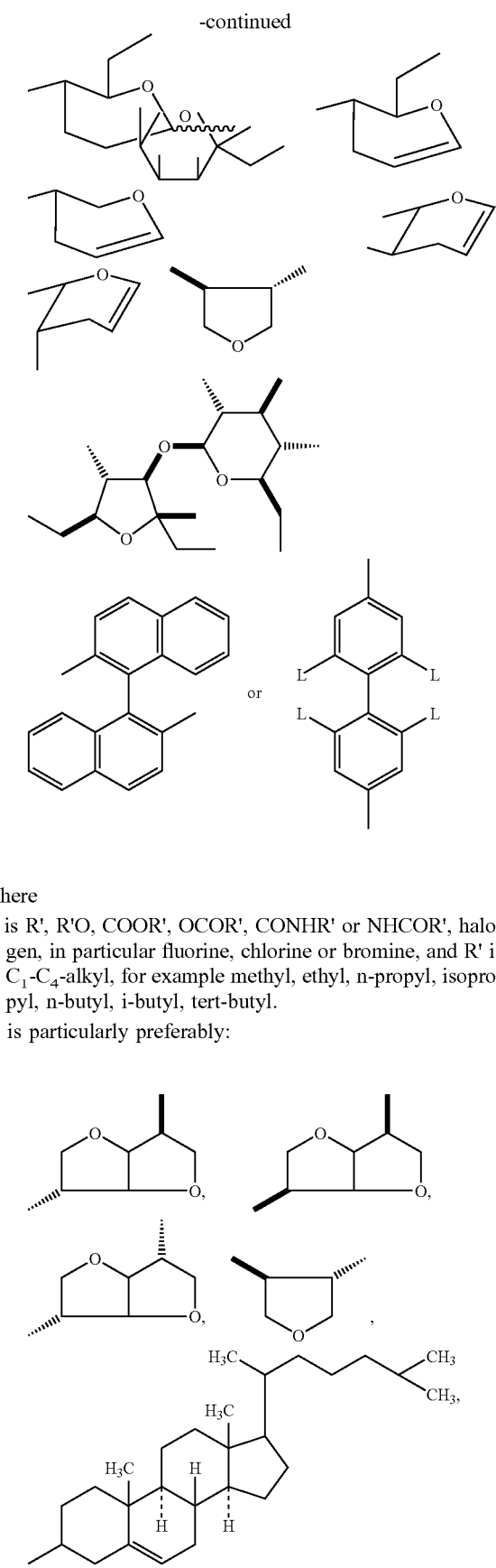
where
L is R', R'O, COOR', OCOR', CONHR' or NHCOR', halogen, in particular fluorine, chlorine or bromine, and R' is $C_1$-$C_4$-alkyl, for example methyl, ethyl, n-propyl, isopropyl, n-butyl, i-butyl, tert-butyl.
X is particularly preferably:

-continued

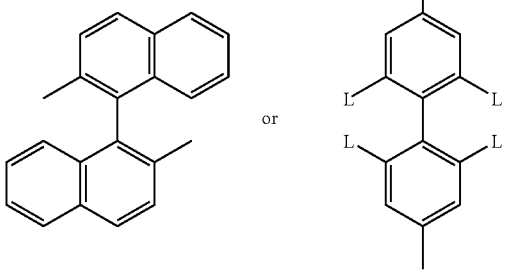

Preferred mesogenic groups M' in the chiral compounds of the formula Id are:

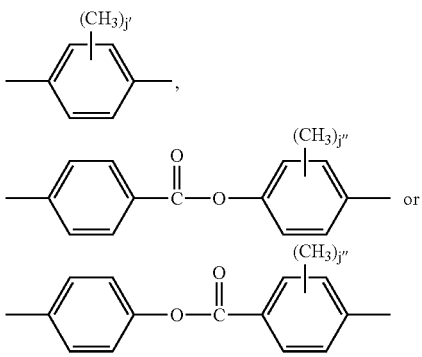

where j' and j" are 0 or 1.

Further chiral compounds containing these and other suitable chiral radicals X are mentioned, for example, in WO 95/16007, EP 0 747 382 A1, EP 0 750 029 A1, EP 1 136 478 A1 and DE 198 43 724 A1.

The present invention provides the use of the nonpolymerizable and polymerizable liquid-crystalline compositions for producing optical components, such as LCDs, polarizers or filters.

The present invention furthermore provides such optical components which have been obtained using the nonpolymerizable and polymerizable liquid-crystalline compositions.

The polymerizable liquid-crystalline compositions according to the invention can furthermore be used for printing or coating substrates. These compositions may comprise further additives. Suitable additives include additives selected from the group consisting of:

1) photoinitiators,
2) diluents,
3) additives selected from the group consisting of:
a) antifoams and deaerators,
b) lubricants and flow auxiliaries,
c) thermally curing or radiation-curing auxiliaries,
d) substrate wetting auxiliaries,
e) wetting and dispersion auxiliaries,
f) hydrophobicizing agents and
g) adhesion promoters and auxiliaries for improving the scratch resistance,
4) additives selected from the group consisting of:
a) dyes and
b) pigments, and
5) additives selected from the group consisting of light, heat and/or oxidation stabilizers.

The chemicophysical nature of these additives is described in detail in WO 00/47694.

The present invention furthermore provides printed or coated substrates which have been produced using the polymerizable compositions according to the invention, if desired in admixture with the abovementioned additives.

Examples of such substrates are paper and cardboard products, for example for carrier bags, magazines, brochures, gift wrappings and packaging materials for consumables, food products and luxury products, sheets, for example for decorative or non-decorative packaging, textiles of any kind and leather. Further suitable substrates are materials used for producing banknotes, securities, admission tickets and the like.

Further substrates are (consumer) electronic products, such as music cassettes (MCs), SVHS and VHS cassettes, minidiscs (MDs), compact discs (CDs), digital versatile discs (DVDs) and the corresponding reproduction and/or recording equipment, televisions, radios, telephone/mobile phones, electronic data processing equipment etc. and products from the leisure, sports, domestic and games sector, for example bicycles, childrens vehicles, skis, snowboards and surfboards, in-line skates, roller skates and ice-skates and domestic appliances. Such substrates furthermore include writing utensils and spectacle frames, for example.

Other substrates are surfaces encountered in the construction sector, such as building walls or windowpanes. In the latter case, a functional effect may be desired in addition to a decorative effect. Thus, it is possible to produce multilayers on the window material whose individual layers have different chemicophysical properties. If, for example individual layers of the polymerizable liquid-crystalline compositions having opposite twist (by adding one enantiomer of a chiral compound and the corresponding optical antipode) or individual layers of crosslinked cholesteric liquid-crystalline compositions having the same helical handedness but different pitch and thus different reflection properties (by adding different concentrations of chiral compound) are applied, specific wavelengths or wavelength ranges of the light spectrum can be reflected in a controlled manner. In this way it is possible for example, to provide a window coating which is IR or UV reflective. For this aspect of the compositions according to the invention, in particular heat-insulating coatings, reference is also made to WO 99/19267.

The invention furthermore provides the use of the polymerizable liquid-crystalline compositions according to the invention for preparing dispersions and emulsions, which are preferably water-based. For the preparation of such dispersions and emulsions, reference is made to WO 96/02597 and 98/47979 which describe the preparation of dispersions and emulsions using liquid-crystalline materials.

Accordingly the present invention also provides such dispersions and emulsions which have been prepared using the polymerizable liquid-crystalline compositions according to the invention. These dispersions and emulsions can likewise be used for printing and coating substrates as described above by way of example.

The present invention furthermore provides the use of the polymerizable liquid-crystalline compositions according to the invention for producing films. For the purposes of the present invention, such films are in particular self-supporting layers as obtained by polymerizing the compositions. These films may also be on substrates or backings such that the films can be removed and transferred to other substrates or backings for permanent adhesion by appropriate measures. Such films can be used, for example, in film coating and laminating processes.

Accordingly, the present invention furthermore provides such films which have been produced using the polymerizable liquid-crystalline compositions according to the invention.

The present invention furthermore provides the use of the polymerizable liquid-crystalline compositions according to the invention for producing pigments.

The production of such pigments is known and described in detail in WO 99/11733, for example. Furthermore, it is also possible to produce pigments of predefined shape and size by using printing methods or by means of nets with gaps in which the polymerizable composition is placed. The liquid-crystalline composition is then polymerized or condensed followed by removal from the substrate or net. These procedures are described in detail in WO 96/02597, 97/27251, 97/27252 and EP 0 931 110 A1.

The polymerizable liquid-crystalline compositions are converted into polymers having a frozen liquid-crystalline order structure with the aid of their reactive groups and, depending on their chemical nature, by condensation or free-radical or ionic polymerization processes which can be initiated by photochemical reaction.

These pigments may be single-layered or multilayered. However the latter pigments can usually only be obtained if coating processes are used in which a plurality of layers are formed successively on top of one another followed by a final mechanical comminution.

Accordingly, the present invention also provides pigments which have been prepared from such polymerizable liquid-crystalline compositions according to the invention.

EXAMPLES

Example 1

Synthesis of Compound 1 According to the Invention:

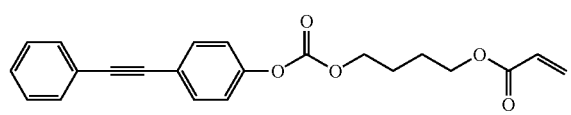
(1)

Synthesis of Compound 1a:

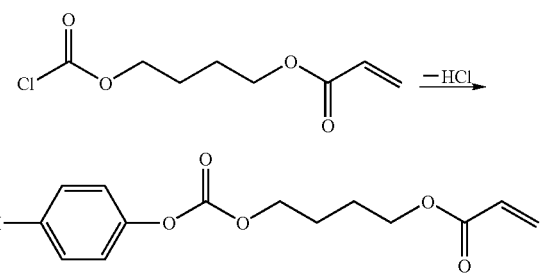

Dimethylformamide (DMF; 100 cm³) was admixed with 4-iodophenol (14.3 g, 0.065 mol) and N,N-dimethylcyclohexylamine (DMCA; 24.7 g, 0.195 mol) and Kerobit BHT (one spatula tip). Acryloyloxybutyl chloroformate (15.4 g, 0.071 mol) was added dropwise at 0-5° C. The mixture was stirred for 3 hours at 40° C. and 16 hours at room temperature and then poured onto 1 m hydrochloric acid, extracted with methyl chloride and dried over sodium sulfate, and the solvent was removed.

Yield of compound 1a: 97.8% of theory.

Synthesis of Target Compound 1:

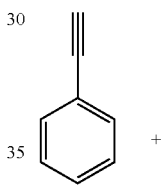
+

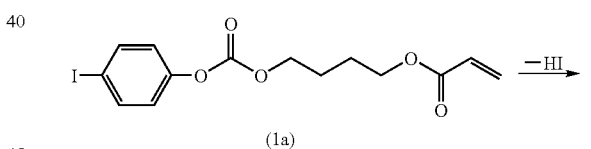
(1a)

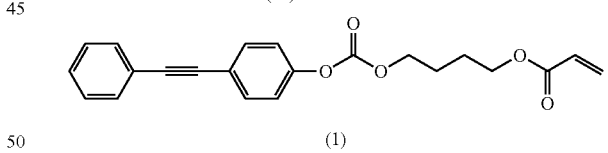
(1)

DMF (42 cm³) was admixed with compound 1a (10.5 g, 0.027 mol), bis(triphenylphosphine)palladium(II) chloride (0.097 g, 0.5 mol % based on the number of moles of compound 1a), copper(I) iodide (0.027 g, 0.5 mol % based on the number of moles of compound 1a) and triethylamine (27 cm³, 0.194 mol). Phenylacetylene (2.7 g, 0.027 mol) in DMF (50 cm³) was added dropwise at 40° C. under a nitrogen atmosphere. The mixture was stirred for 5 hours at 50° C. and then poured onto 1 m hydrochloric acid and extracted with 500 cm³ of toluene, the toluene extract was dried over sodium sulfate and the solvent was removed. Column purification (silica gel, toluene) gave compound 1 in a yield of 20% of theory. The melting point was 59-60° C.

Example 2

Synthesis of Compound 2 According to the Invention:

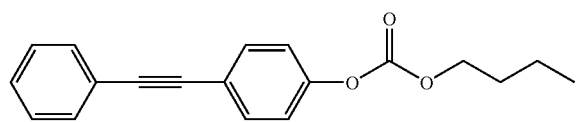

Synthesis of Compound 2a:

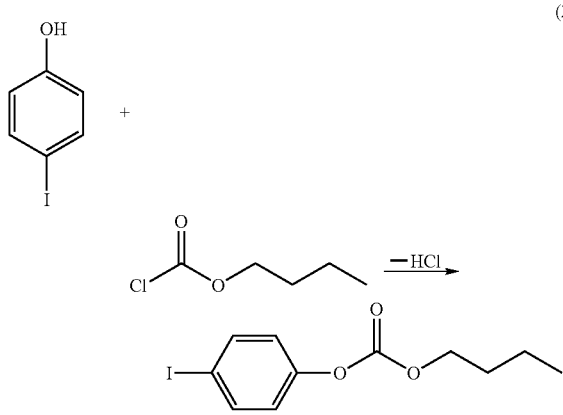

DMF (100 cm³) was admixed with 4-iodophenol (14.3 g, 0.065 mol) and DMCA (26.0 g, 0.205 mol). Butyl chloroformate (15.4 g, 0.071 mol) was added dropwise at 0-5° C. The mixture was stirred for a further 3 hours at 40° C. and then poured onto 1 m hydrochloric acid (1 molar), extracted with toluene and dried over sodium sulfate, and the solvent was removed.

Yield of compound 2a: 93.8% of theory.

Synthesis of Target Compound 2:

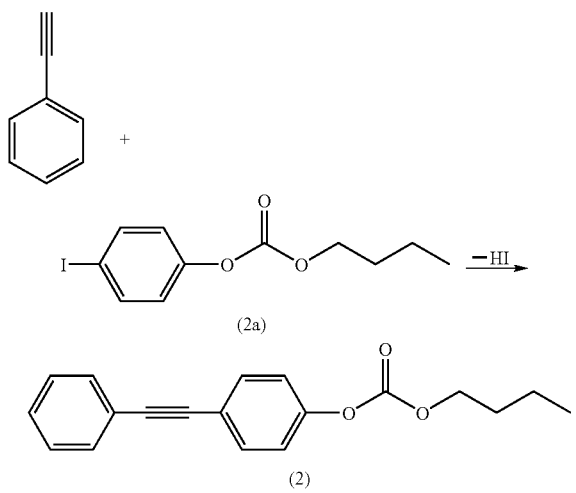

DMF (42 cm³) was admixed with compound 2a (8.5 g, 0.027 mol), bis(triphenylphosphine)palladium(II) chloride (0.097 g, 0.5 mol % based on the number of moles of compound 1a), copper(I) iodide (0.027 g, 0.5 mol % based on the number of moles of compound 1a) and triethylamine (27 cm³, 0.193 mol). Phenylacetylene (2.7 g, 0.027 mol) in DMF (50 cm³) was added dropwise at 40° C. under a nitrogen atmosphere. The mixture was stirred for 5 hours at 50° C. and then poured onto 1 m hydrochloric acid and extracted with toluene (300 cm³), the toluene extract was dried over sodium sulfate and the solvent was removed. Column purification (silica gel, toluene) gave compound 2 in a yield of 64% of theory. The melting point was 55-56° C.

Example 3

Synthesis of Compound 3 According to the Invention:

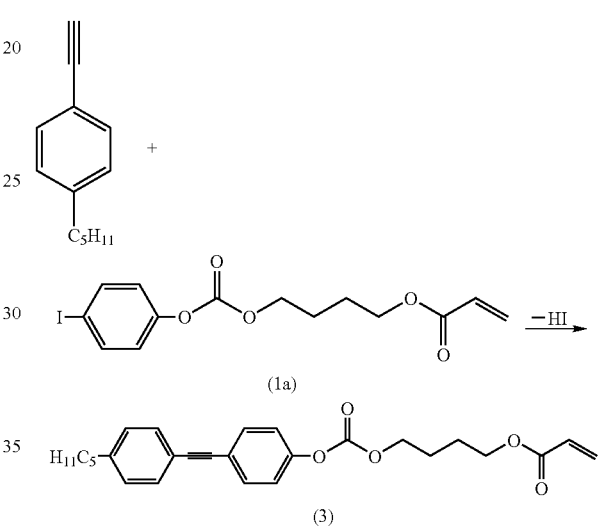

DMF (45 cm³) was admixed with compound 1a (11.9 g, 0.029 mol), bis(triphenylphosphine)palladium(II) chloride (0.105 g, 0.5 mol % based on the number of moles of compound 1a), copper(I) iodide (0.029 g, 0.5 mol % based on the number of moles of compound 1a) and triethylamine (29 cm³, 0.21 mol). 4-Pentylphenylacetylene (5.0 g, 0.029 mol) in DMF (55 cm³) was added dropwise at 40° C. under a nitrogen atmosphere. The mixture was stirred for 5 hours at 50° C. and then poured onto 1 m hydrochloric acid and extracted with ethyl chloride (300 cm³), the extract was dried over sodium sulfate and the solvent was removed. Purification by triturating with petroleum ether gave compound 3 in a yield of 37.6% of theory. The melting point was 60-67° C.

We claim:
1. An alkyne compound of the formula I

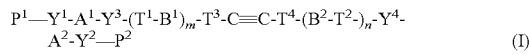

in which
$P^1$, $P^2$ are each, independently of one another, hydrogen, $C_1$-$C_{12}$-alkyl, a polymerizable group, a group suitable for polymerization or a radical having a polymerizable group or a group suitable for polymerization,
$Y^1$, $Y^2$, $Y^3$, $Y^4$ are each, independently of one another, a single chemical bond, —O—, —S—, —CO—, —CO—O—, —O—CO—, —CO—N(R)—, —(R)

N—CO—, —O—CO—O—, —O—CO—N(R)—, —(R)N—CO—O— or —(R)N—CO—N(R)—, $B^1$, $B^2$ are each, independently of one another, —C≡C—, a single chemical bond, —O—, —S—, —CO—, —CO—O—, —O—CO—, —CO—N(R)—, —(R)N—CO—, —O—CO—O—, —O—CO—N(R)—, —(R)N—CO—O— or —(R)N—CO—N(R)—, R, at each occurrence and independently of the meaning in $Y^1$ to $Y^4$, $B^1$ and $B^2$, is hydrogen or $C_1$-$C_4$-alkyl, $A^1$, $A^2$ are each, independently of one another, a single chemical bond or a spacer having from one to 30 carbon atoms, $T^1$, $T^2$, $T^3$, $T^4$ are each, independently of one another, a divalent saturated or unsaturated carbocyclic or heterocyclic radical, and m, n are each, independently of one another, 0 or 1, wherein at least one pair of $P^1$—$Y^1$ and $Y^3$ or one pair of $Y^2$—$P^2$ and $Y^4$ are acrylate or methacrylate and —O—CO—O—.

2. A compound as claimed in claim 1, wherein $T^1$ to $T^4$ in formula I are selected from the group consisting of

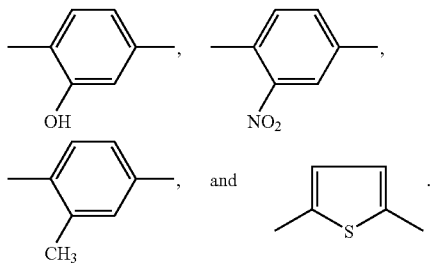

3. The compound as claimed in claim 1, wherein both $Y^3$ and $Y^4$ formula I are —O—CO—O—.

4. The compound as claimed in claim 1, wherein the sum of the variables m and n in formula I is 0 or 1.

5. A polymerizable liquid-crystalline composition comprising at least one compound of the formula I as claimed in claim 1, wherein the liquid-crystalline composition is polymerizable.

6. A method of printing or coating a substrate comprising:
   printing or coating a sustrate with the compostion as claimed in claim 5.

7. A printed or coated substrate comprising the composition as claimed in claim 5.

8. A method of preparing a dispersion or an emulsion comprising:
   dispersing the composition as claimed in claim 5 in a liquid medium to obtain the dispersion or emulsion.

9. A dispersion or emulsion comprising the composition as claimed in claim 5.

10. A method of producing a film comprising:
    forming the composition as claimed in claim 5 into a film.

11. A film comprising the composition as claimed in claim 5.

12. A method of producing a pigment comprising forming the pigment with the composition as claimed in claim 5.

13. A pigment comprising a composition as claimed in claim 5.

14. An method of producing an optical component comprising forming an optical component with the compositoin as claimed in claim 5.

15. An optical component comprising the composition as claimed in claim 5.

* * * * *